United States Patent
Holbrook et al.

[11] Patent Number: 6,094,612
[45] Date of Patent: Jul. 25, 2000

[54] SHUTDOWN/RECOVERY ROUTINE

[75] Inventors: Gerald L. Holbrook; Andrew J. Harkenrider, both of Rochester Hills; Michael J. McNeil, Auburn Hills, all of Mich.

[73] Assignee: DaimlerChrysler Corporation, Auburn Hills, Mich.

[21] Appl. No.: 09/283,910

[22] Filed: Apr. 1, 1999

[51] Int. Cl.[7] .................................................. F16H 61/16
[52] U.S. Cl. ................................ 701/63; 701/55; 477/906
[58] Field of Search ............................... 477/906; 701/55, 701/56, 62, 63

[56] References Cited

U.S. PATENT DOCUMENTS

| | | | |
|---|---|---|---|
| 4,685,051 | 8/1987 | Hattori et al. | 477/115 X |
| 4,838,125 | 6/1989 | Hamano et al. | 701/56 X |
| 4,875,391 | 10/1989 | Leising et al. | 477/155 |
| 4,928,235 | 5/1990 | Mehta et al. | 701/65 |
| 4,935,872 | 6/1990 | Benford et al. | 701/51 |
| 4,939,928 | 7/1990 | Carle et al. | 73/118.1 |
| 4,947,329 | 8/1990 | Benford et al. | 701/66 |
| 4,955,258 | 9/1990 | Ito et al. | 701/62 X |
| 4,965,735 | 10/1990 | Holbrook et al. | 701/51 |
| 4,975,844 | 12/1990 | Holbrook et al. | 701/63 |
| 4,975,845 | 12/1990 | Mehta | 701/59 |
| 4,982,620 | 1/1991 | Holbrook et al. | 74/731.1 |
| 4,986,145 | 1/1991 | Mehta | 477/34 |
| 4,998,200 | 3/1991 | Glowczewski et al. | 701/51 |
| 5,304,981 | 4/1994 | Leising et al. | 340/456 |
| 5,325,083 | 6/1994 | Nassar et al. | 340/456 |
| 5,420,565 | 5/1995 | Holbrook | 701/51 |
| 5,456,647 | 10/1995 | Holbrook | 477/154 |
| 5,584,209 | 12/1996 | Issa | 74/335 |
| 5,613,921 | 3/1997 | Sugiyama et al. | 477/906 X |
| 5,675,315 | 10/1997 | Issa et al. | 340/456 |
| 5,767,769 | 6/1998 | Issa | 564/308 |
| 5,777,211 | 7/1998 | Binienda et al. | 73/53.05 |
| 5,861,803 | 1/1999 | Issa | 701/63 X |

*Primary Examiner*—Charles A Marmor
*Assistant Examiner*—Ankur Parekh
*Attorney, Agent, or Firm*—Marc Lorelli

[57] ABSTRACT

The present provides a shutdown shift schedule which allows a vehicle driver an increased number of gear states to increase driveability. This method monitors the gear state conditions indicative of the gear state which said automatic transmission is in. When the shift state conditions vary from predetermined standards, the controller uses the shutdown shift schedule in place of the shift schedule for changing gears of the automatic transmission. This shutdown shift schedule is adapted to allow a 3-1 shift when the shift solenoid is in a shift D position and the shift state is 3. The shutdown shift schedule is also adapted to allow a 3-2 shift when the shift state is 3 and the shift solenoid is in the shift 2 position.

18 Claims, 7 Drawing Sheets

| 4WD 4-SPEED ELECTRONIC TRANSMISSION | MANUAL VALVE POSITION | GEAR | TORQUE RATIO | CLUTCHES APPLIED |
|---|---|---|---|---|
| | | REV. | 3.00 | RC, LR |
| | | PARK,NEU. | | LR |
| | | 1ST. | 3.00 | UD, FW, (LR) |
| | | 2ND. | 1.67 | UD, 2C |
| | | 2' | 1.50 | UD, 4C |
| | | DIRECT | 1.00 | UD, OD |
| | | 4TH. | 0.75 | OD, 4C |
| | | 4' | 0.67 | OD, 2C |

UD— UNDERDRIVE CLUTCH
OD— OVERDRIVE CLUTCH
R— REVERSE CLUTCH
4C— 4TH. CLUTCH
2C— 2ND. CLUTCH
LR— LOW-REVERSE CLUTCH
FW— FREE WHEEL
CC— CONVERTER CLUTCH

C— CARRIER ASSEMBLY  A— ANNULUS GEAR  S— SUM GEAR  CC— CONVERTER CLUTCH  FW— FREE WHEEL CLUTCH

*Fig-3A*

| PATH | ELEMENTS | | | | | $C_R$ COEFFICIENTS | | | |
|---|---|---|---|---|---|---|---|---|---|
| | LR | 2C | OD | 4C | UD | $C_0$ | $C_1$ | $C_2$ | |
| in2 & 3s | | R | A | OFF | ON | 0.1 | 0.01 | 0.3 | |
| in2' & 3s | OFF | OFF | A | R | ON | 0.1 | 0.01 | 0.3 | |
| in3 & 2s | | A | R | OFF | ON | 0.1 | 0.01 | 0.25 | |
| in4 & 3s | | OFF | ON | R | A | 0.1 | 0.01 | 0.2 | |

SHUTDOWN/RECOVERY ROUTINE

BACKGROUND OF THE INVENTION

I. Technical Field

The present invention relates generally to a shutdown and recovery routine for an automatic transmission, and more particularly, a shutdown and recovery routine which allows an automatic transmission to shift between an increased number of gear states.

II. Discussion

In the present design of automatic transmissions, a series of clutches or friction elements provide a means for application and release of separate members to and from each other during the flow of power through the transmission. These clutches thereby constitute the means by which gears within the transmission are selectively engaged or disengaged from either the engine crankshaft or the transmission case. Four speed transmissions, of the type which this invention is directed, generally include any number of elements or clutches which are applied or engaged in various combinations in relation to each of the vehicle's gears. Each of these clutches generally includes a plurality of alternating clutch plates and clutch disks which, when applied, engage one another and which disengage when the clutch is not applied To apply each of these clutches, an electronically controlled hydraulic fluid actuating device such as a solenoid-actuated valve is used. There is typically one valve for each clutch. These valves each control fluid flow to a respective clutch apply cavity. The flow of fluid into a clutch apply cavity results in the application or engagement of that clutch. Fluid flow is enabled by the opening of the solenoid-actuated valve in response to command or control signals received by the solenoid from an electronic control system.

The electronic control system typically includes a microcontroller-based electronic control system capable of receiving input signals indicative of various vehicle operating conditions such as engine speed, torque converter turbine speed, transmission output shaft speed (vehicle speed), throttle angle position, brake application, predetermined hydraulic pressures, a driver selected gear or operating condition (PRND2L), engine coolant temperature and/or the ambient air temperature. Based on the information contained in these signals, the controller generates command or control signals for causing the actuation of each of the solenoid-actuated valves which regulate the application and release of fluid pressure to and from the apply cavities of the clutches or frictional units of the transmission. In most transmissions, the torque converter input speed and the output shaft speed are used to determine which gear state the transmission is presently operating. This information can then be used to ensure that the actual transmission gear state matches the gear state indicated in the shift schedule. Accordingly, the controller is programmed to execute predetermined shift schedules stored in a memory of the controller through appropriate command signals to the solenoid-actuated valves.

However, if the electronic control system reports a different gear state, based on the torque converter and output speed, than is reported by the shift schedule in the processor, then one or the other is providing incorrect information indicative of a defective sensor or other device. If the electronic control system attempts to change gear states under these conditions, the improper readings may cause the automatic transmission to engage or disengage improper clutch elements. This could result in damage to the transmission or injury to a vehicle driver. If the electronic control system maintains the transmission in its present gear state, not allowing gear change, the vehicle is forced to operate over a broad range of speeds in only one gear. Thus, the driver experiences poor driving characteristics to the point of possibly not being able to operate the vehicle. The present invention was developed in light of these drawbacks.

SUMMARY OF THE INVENTION

The present invention overcomes the aforementioned drawbacks, among others, by providing a shutdown shift schedule which allows a vehicle driver an increased number of gear states to increase driveability. This method involves monitoring conditions which indicate the gear state which the automatic transmission is operating in. When the shift state conditions vary from that reported by the normal shift schedule by a predetermined amount, the controller uses the shutdown shift schedule in place of the shift schedule for changing gears of the automatic transmission. This shutdown shift schedule is adapted to allow a 3-1 shift when the shift solenoid is in the overdrive position and shift state is 3rd gear. The shutdown shift schedule is also adapted to allow a 3-2 shift when the shift state is 3rd gear and the shift solenoid is in the second or low position.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
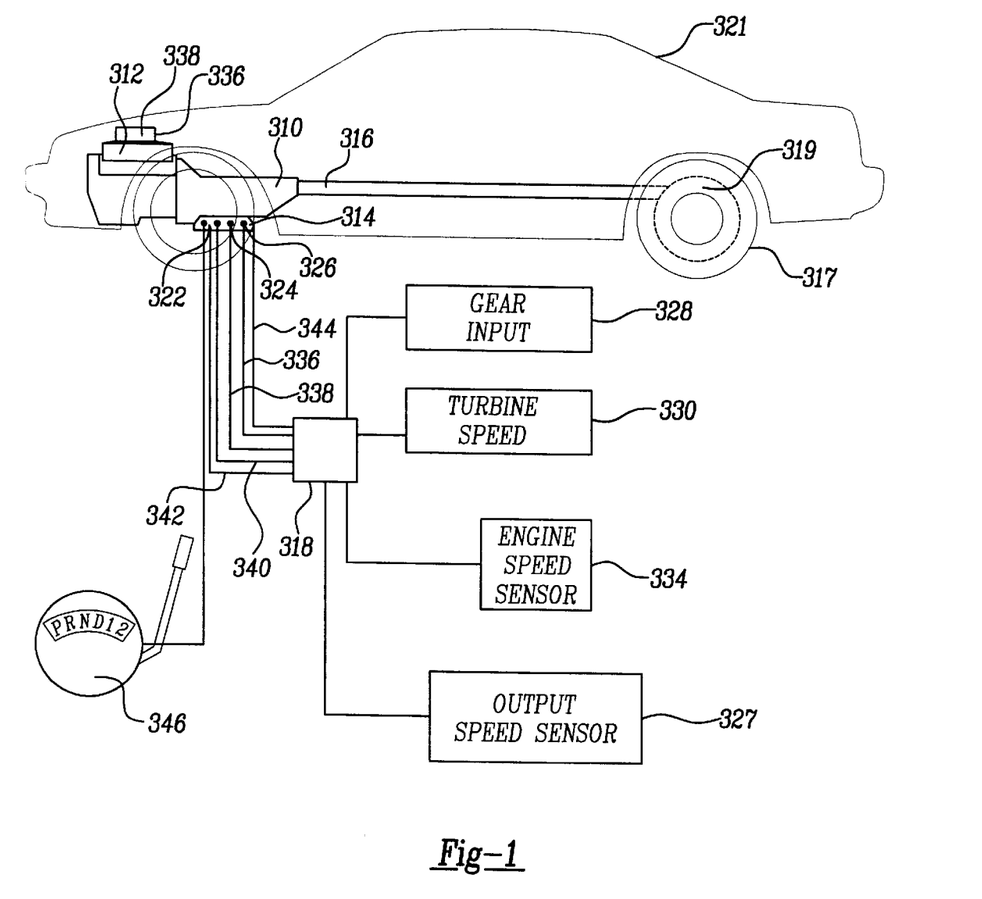
FIG. 1 is a schematic view of an automatic transmission operated according to the principles of the present invention.

Referring now to FIG. 1, an automatic transmission 310 is shown in conjunction with a vehicle 321 having an engine 312 and controlled by an electronic control system 318. The electronic control system 318 has a processor, random access and non-volatile memory, and is adapted to interact as necessary with other vehicle electronic control modules. As shown, the electronic control system 318 electrically communicates with a number of sensors to receive signals indicative of engine rotational speed from engine speed sensor 334, torque converter turbine rotational speed from turbine speed sensor 330, and the gear or operating condition (PRND2L) 328. Each of these signals may be provided by one or more vehicle sensing devices (not shown) as commonly known to those skilled in the art.

The electronic control system 318 provides an energizing signal to each of a plurality of solenoid actuating valves through buses 336, 338, 340, 342 and 344. An energizing signal, or the absence of an energizing signal, on buses 336, 338, 340, 342 and 344 causes the application and release of the associated frictional elements of the system. These elements are actuated by the underdrive (UD) clutch valve 106, 2nd gear (2C) clutch valve 118, 4th gear clutch valve (4C) 124, overdrive (OD) clutch valve 112 and multi select (MS) valve 94. The mechanical operation of each clutch element will be discussed in greater detail in the upcoming discussion.

Each clutch has a logical on and a logical off position. When a particular clutch is in the logical on position, it is frictionally engaged to a planetary gear set or other rotating element. Likewise, when a clutch is in a logical off position, it is released, allowing its associated rotational element to freely rotate. The logical on position may be accomplished by using the shift lever 346 or the 2C 118, OD 112, UD 106, 4C 124 or MS 94 solenoid-actuated valves to either apply or remove hydraulic pressure, depending on the particular clutch being applied. It will be understood that a normal shift schedule is a pattern of shifting between these gear states under normal conditions based on various operating conditions.

Figure 3:
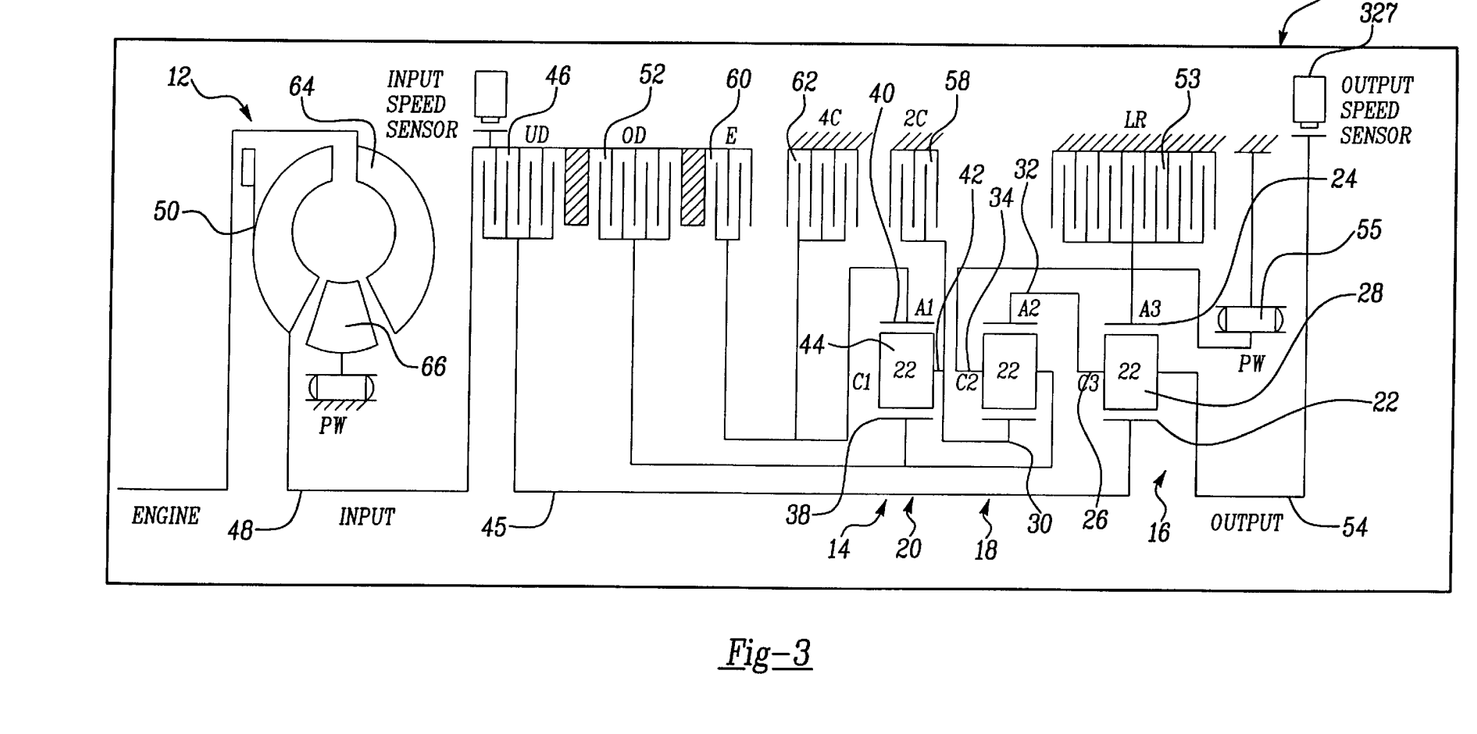
FIG. 3 is a schematic diagram of the transmission gear train operated according to the principles of the present invention.

With reference to FIG. 3, the automatic transmission 10 includes a torque converter 12 which is operably connected to a multiple planetary gear system 14. The multiple planetary gear system 14 includes a first planetary gear assembly 16, a second planetary gear assembly 18, and a third planetary gear assembly 20. The first planetary gear assembly 16 includes a sun gear 22, an annulus gear 24, a planetary carrier assembly 26, and a plurality of planetary gears 28 rotatably mounted to the planetary carrier 26. The second planetary gear assembly 18 includes a sun gear 30, an annulus gear 32, a planetary carrier 34, and a plurality of planetary gears 36 rotatably mounted on the planetary carrier 34. The third planetary gear assembly 20 includes a sun gear 38, an annulus gear 40, a planetary carrier 42, and a plurality of planetary gears 44 rotatably mounted on the planetary carrier 42.

The sun gear 22 of the first planetary gear assembly 16 is selectively driven by engagement of an UD clutch element 46 with an input shaft 48 which is driven by a turbine 50 of the torque converter 12. The annulus gear 24 of the first planetary gear assembly 16 is attached to the planetary carrier 34 of the second planetary gear assembly 18 which is also attached to the sun gear 38 of the third planetary gear assembly 20. Each of these elements are selectively engaged by an OD clutch element 52 which engages the annulus gear 24 of first planetary gear assembly 16, the carrier assembly 34 of the second planetary gear assembly 18, and the sun gear 38 of the third planetary gear assembly to the input shaft 48. The planetary carrier 26 of the first planetary gear assembly 16 is attached to an output shaft 54 and is also attached to the annulus gear 32 of the second planetary gear assembly 18. The sun gear 30 of the second planetary gear assembly 18 is attached to the planetary carrier 42 of the third planetary gear assembly 20 which is engagable by a 2C clutch element 58 which is engagable to prevent rotation of the carrier 42 and sun gear 30 relative to the transmission housing. The annulus gear 40 of the third planetary gear assembly 20 is engagable by a reverse clutch 60 for selectively engaging the annulus gear 40 with the input shaft 48. In addition, the annulus gear 40 of the third planetary gear assembly 20 is also engagable with a 4C clutch element 62 for preventing rotation of the annulus gear 40 relative to the transmission housing.

The torque converter 12 includes an impeller 64 which is attached to the engine (not shown). As the engine drives the impeller 64, fluid which is propelled by the blades of the impeller 64 drive the turbine 50 in order to drive the input shaft 48. The stator 66 directs the fluid from the turbine 50 back to the impeller 64 in order to achieve torque multiplication, as is well known in the art.

Figure 3A:
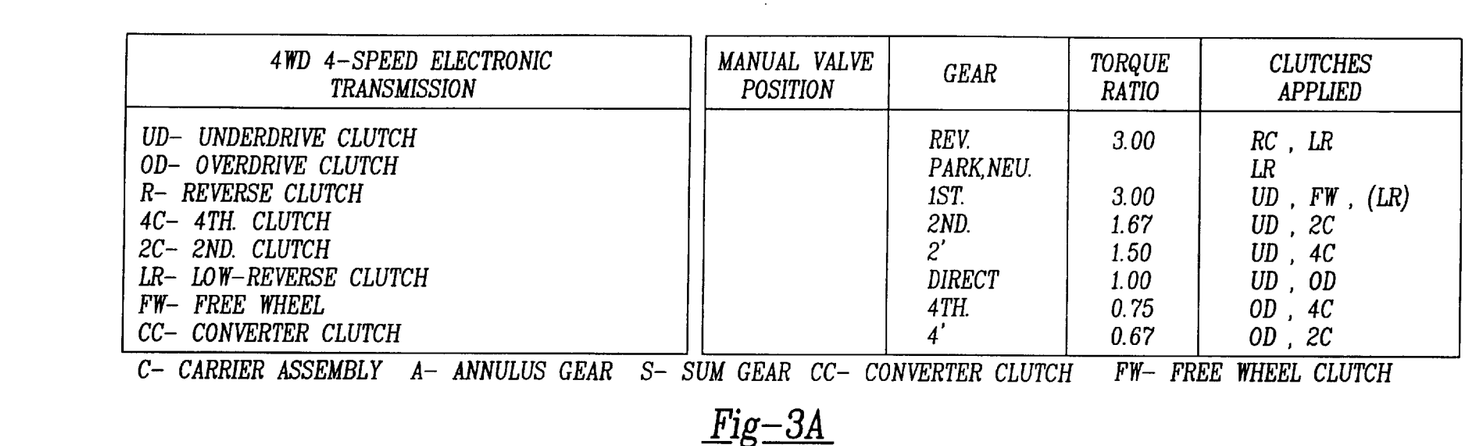
FIG. 3A is a table illustrating the applied clutches for each gear ratio of the transmission operated according to the principles of the present invention.

FIG. 3A illustrates the different operating modes of the automatic transmission, as shown in FIG. 3. In particular, in order to obtain a reverse gear operation, the reverse clutch 60 and LR clutch element 53 must be applied. In order to obtain a park, neutral position, the low/reverse clutch may be applied. In order to obtain first gear, the UD clutch element 46 and the free wheel clutch or overrunning clutch element (ORC) 55 or the low/reverse clutch 53 must be applied. In order to obtain second gear, the UD clutch element 46 and 2C clutch element 58 must be applied. In order to obtain a second prime ($2^{nd}$) gear, the UD clutch element 46 and 4C clutch element 62 must be applied. In order to obtain the direct gear ($3^{rd}$), the UD clutch element 46 and OD clutch element 52 must be applied. In order to obtain fourth gear, the UD clutch element 46 and 4C clutch element 62 must be applied. In order to obtain a fourth prime gear ($4^{th}$), the UD clutch element 46 and 2C clutch element 58 must be applied. It will be understood that a normal shift schedule is a pattern of shifting between these gear states under normal conditions based on various operating conditions.

Figure 2:
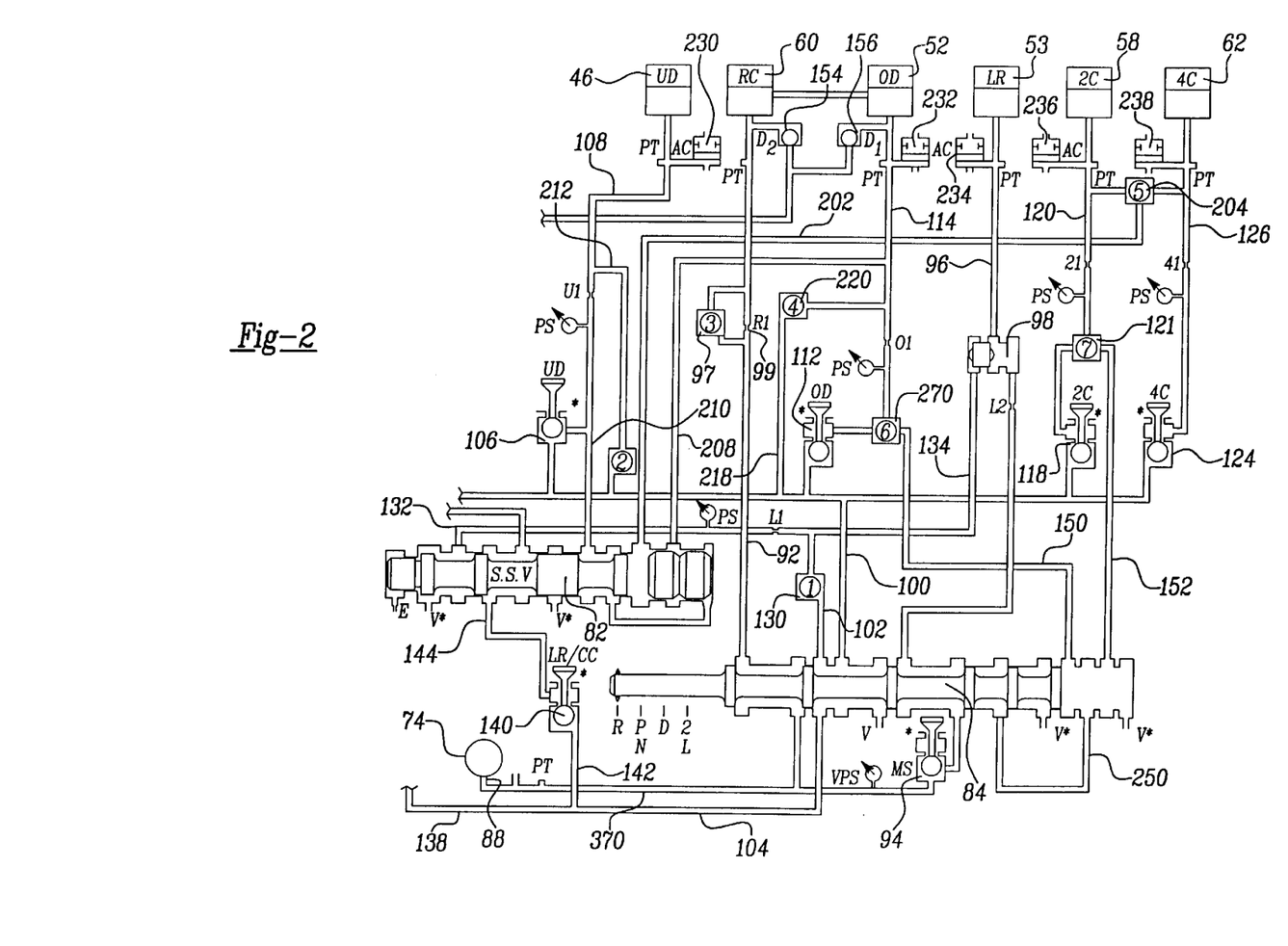
FIG. 2 is a schematic view of the hydraulic control system of the automatic transmission operated according to the principles of the present invention.

With reference to FIG. 2, the hydraulic control system 70 (partially shown), for selectively engaging the UD clutch element 46, OD clutch element 52, low/reverse clutch 53, 2C clutch element 58, 4C clutch element 62, and RC clutch element 60, will now be described. The hydraulic control system 70 includes a pump 72 which supplies hydraulic fluid to a manual valve 84 via passage 86.

In the reverse "R" position of the manual valve 84, hydraulic fluid is communicated to the RC clutch element 60 via passage 92 and to the low/RC clutch element 53, when the multi-select solenoid valve (MS solenoid valve) 94 is de-energized, via passage 96. A ball check valve 97 is provided in bypass relationship to a restriction 99 in passage 92. A low/reverse switch valve 98 is provided in the passage 96. In order to block a transmission shift to the reverse gear, the transmission controller, in response to a detected vehicle speed which exceeds a predetermined value (for example, 8 mph), holds the MS solenoid valve 94 in the activated condition so that the low/RC clutch element 53 cannot be actuated.

When the manual valve 84 is in the drive "D" position, hydraulic fluid is delivered to the passages 100, 102, and 104. Upon deactivation of the underdrive clutch solenoid (UD clutch solenoid) 106, hydraulic fluid can be delivered to the UD clutch element 46 from passage 100 via passage 108. By activation of the overdrive clutch solenoid (OD clutch solenoid) 112, hydraulic fluid can be delivered to OD clutch element 52 via passage 114. Through actuation of the second gear clutch solenoid (2C clutch valve) 118, hydraulic fluid can be delivered to the 2C clutch element 58 from passage 100 via passage 120 through dual acting ball check valve 121. By actuating the fourth gear clutch solenoid 124, hydraulic fluid can be delivered to the 4C clutch element 62 from passage 100 via passage 126.

Passage 102 communicates fluid through the ball check valve 130 to the solenoid switch valve 82 via passage 132 and to the low/reverse switch valve 98 via passage 134. Passage 104 delivers hydraulic fluid to a low/reverse torque converter clutch solenoid valve 140. When in the open position, the low/reverse torque converter clutch solenoid valve 140 delivers hydraulic fluid to the solenoid switch valve 82 via passage 144. Hydraulic fluid can be delivered to the OD clutch element 52 via passage 150 which communicates with the valve 84. Hydraulic fluid can also be communicated to the 2C clutch element 58 via passage 152 which communicates with the manual valve 84.

The RC clutch element 60 and OD clutch element 52 are each provided with dribbler valves 154, 156, respectively which allow a slow pressure release from the RC clutch element 60 and OD clutch element 52, respectively.

Hydraulic fluid is communicated between the solenoid switch valve 82, the 2C clutch element 58, and 4C clutch element 62 via passage 202 which communicates with the three-way ball check valve 204. Hydraulic fluid is communicated between the solenoid switch valve 82 and the OD clutch element 52 via passage 208 which communicates with passage 114. Hydraulic fluid is communicated between the solenoid switch valve 82 and the UD clutch element 46 via passage 210 which communicates with passage 108. A bypass line 212 is provided between fluid passage 100 and fluid passage 108 which communicates with the UD clutch element 46. A bypass line 218 is provided between fluid passage 100 and fluid passage 114 which communicates with OD clutch element 52 through check ball 220.

The fluid passage 108 which communicates with the UD clutch element 46 is provided with an accumulator 230. The passage 114 which communicates with the OD clutch element 52 is provided with accumulator 232. The passage 96 which communicates with the low/reverse clutch 53 is provided with an accumulator 234. The passage 120 which communicates with the 2C clutch element 58 is provided with an accumulator 236, and the passage 126 which communicates with the 4C clutch element 62 is provided with an accumulator 238.

The skilled artisan will appreciate that the present invention may be used with modifications or variations of the above described transmission and is not limited to the automatic transmission described herein.

Figure 4:
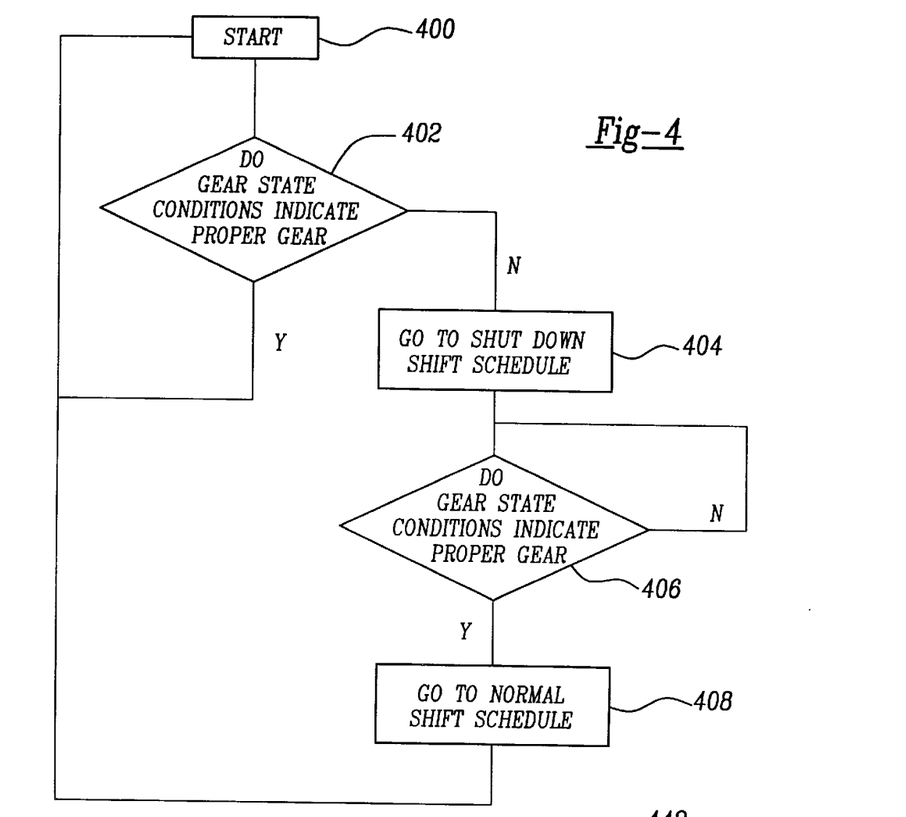
FIG. 4 is a flow chart depicting the operation of an automatic transmission according to the present invention.

Referring now to FIG. 4, a flow chart depicting the operation of the electronic control system of the present invention is now described. In FIG. 4, the electronic control system 318 starts in block 400 where it is operating under a normal shift schedule. Here, electronic control system 318 is sensing a variety of conditions such as turbine speed from turbine speed sensor 330, engine speed from engine speed sensor 334, and output speed from output speed sensor 327. The electronic control system 318 is then programmed to execute predetermined shift schedules stored in a memory of the controller through appropriate command signals to the solenoid actuated valves across buses 344, 336, 338, 340, and 342. As each shift is executed, electronic control system 318 stores the present gear state, as provided by the shift schedule, which the automatic transmission 310 has been shifted into.

In block 402, electronic control system 318 compares the stored value of the gear state which automatic transmission 310 is currently operating against a gear state calculated from turbine speed sensor 330 and output speed sensor 327. By comparing the ratio of the input speed to output speed of the automatic transmission 310, the gear state which it is operating in can then be determined. If the calculated gear state matches the stored gear state, then the turbine speed sensor 330 and the output speed sensor 327 are operating properly. If the calculated gear state does not match the stored value, then there most likely exists a problem either with electronic control system 318 or any of the sensors providing an input thereto. As such, in block 402, if a calculated gear state matches the stored value, then the system is most likely operating properly and the program is returned to block 400 continuing in its normal shift schedule. However, if the calculated gear state does not match the stored value, then the electronic control system moves to block 404 and changes to a shutdown shift schedule (which will be discussed in greater detail). From block 404, the electronic control system moves into block 406 while maintaining the shutdown shift schedule. In block 406, electronic control system 318 continues to monitor the calculated gear state and the stored gear state. If the calculated gear state continues not to match the stored gear state, then electronic control system 318 moves back to the beginning of block 406 and continues to monitor the calculated and stored gear states. While continuing this monitoring, electronic control system 318 continues to operate under the shutdown shift schedule. If, however, the electronic gear state becomes in tune with the stored gear state, then the electronic control system 318 moves out of block 406 and moves to block 408. At block 408, electronic control system 318 resumes the normal shift schedule and moves back to block 400.

It is noted that the actual gear state which automatic transmission 310 is operating may be substituted by that reported by electronic control system 318 from gear input 328. Likewise, the output speed reported by output speed sensor can be replaced by a calculation from the vehicle speed reported by the electronic control system 318. This allows electronic control system 318 to make substitutions for defective sensors.

Figure 9:
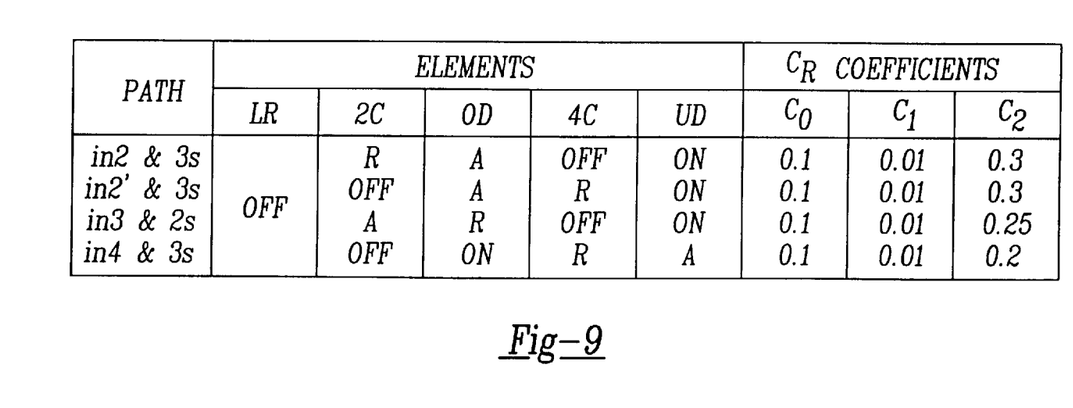
FIG. 9 is a table illustrating the applied clutches for each gear ratio of the transmission operated according to the principles of the present invention.

Referring to FIG. 9, the various conditions of each element during particular shifts during the shutdown shift schedule are illustrated. Because electronic control system 318 or sensors connected thereto are considered to be in a defective state by virtue of being in the shutdown shift schedule, it is desirable to apply and release as few clutch elements as possible to shift the automatic transmission 310. It is also desirable to shift the automatic transmission into as few gear states as possible.

Figure 5:
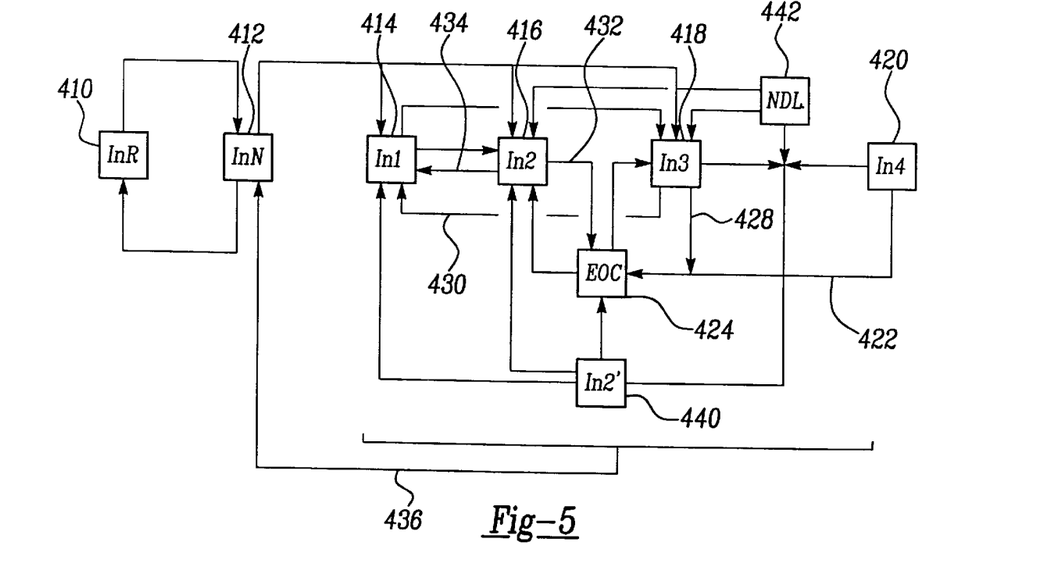
FIG. 5 is a state diagram depicting the operation of an automatic transmission according to the present invention.

Referring now to FIG. 5, a shift state diagram governing the shutdown shift schedule is shown and described. In FIG. 5, various gear states such as reverse gear 410, neutral gear 412, first gear 414, second gear 416, third gear 418, and fourth gear 420 are shown. It is understood that block 402 in FIG. 4 determines the calculated gear state and the stored gear state when automatic transmission 310 is in any one of the particular gear states shown in FIG. 5, not between them.

If electronic control system 318 transitions to shutdown shift schedule in fourth gear, then the electronic control system 318 has several options for downshifting into other gears. As shown in FIG. 5, the electronic control system 318 can transition into third gear at block 418 or second gear at block 416. To transition into third or second gear, the electronic control system 318 can transition through NDL block 442 for reasons which will be discussed. Alternatively, electronic control system 318 can transition automatic transmission 310 into third gear by path 422 through EOC block 424.

When transitioning from fourth gear into third gear, the 4C clutch element 62 is released and the UD clutch element 46 is applied. During this shift, the OD clutch element 52 remains on. As depicted in FIG. 5, automatic transmission 310 is only able to shift out of fourth gear, not allowing any future shifting into fourth gear during the shutdown shift schedule.

If the automatic transmission 310 is shifted from fourth gear to neutral, then the manual shift lever 346 is shifted to neutral and the 4C clutch element 62 and the OD clutch element 52 are released.

Referring to FIG. 5, if the shutdown shift schedule is initiated while the automatic transmission 310 is in third gear, electronic control system 318 has the option of shifting into second gear 416, first gear 414, or neutral 412. If shifted into second gear, the state diagram depicted in FIG. 5 follows path 428 into second gear 416. Mechanically, as shown in FIG. 9, this corresponds to shifting the manual shift lever 346 into second gear and release of the OD clutch element 52 and application of the 2C clutch element 58. This action occurs while the UD clutch element 46 remains on. If shifted into first gear, the state diagram depicted in FIG. 5 follows path 430 which results in release of the OD clutch element 52. Although normal operation requires actuation of the LR clutch element 53 for first gear, because of the overrunning clutch element ORC 55, the LR clutch element 53 need not be applied to hold first gear.

If the shutdown shift schedule is initiated while automatic transmission 310 is in second gear, automatic transmission 310 has the option of upshifting into third gear 418, downshifting into first gear 414, or shifting into neutral 412. Upshift into third gear is depicted by path 432 in FIG. 5 and requires a manual shift of shift lever 346 from the second gear position to the drive position, if not already in the drive position. Downshift into first gear is depicted by path 434 and requires a manual shift of shift lever 346 from the second gear position to the drive position, if not already in the drive position. The neutral shift is depicted by path 436 and requires a manual shift of shift lever 346 from second gear to neutral.

Mechanically, referring to FIG. 9, upshift into third gear from second gear involves the opposite of that depicted for the 3-2 shift discussed above. This correlates into actuation of the OD clutch element 52 and release of the 2C clutch element 58 while the UD clutch element 46 remains on. Shift from second gear 416 into first gear 414 involves release of the 2C clutch element 58 while the UD clutch element 46 remains actuated. Again, because of the ORC 55, the LR clutch element 53 does not need to be actuated.

Referring to FIG. 5, if the shutdown shift schedule is initiated while automatic transmission 310 is in first gear, automatic transmission 310 can shift from first gear 414 into second gear 416, from first gear 414 into third gear 418 or from first gear 414 into neutral 412. Shifting from first gear to third gear requires application of the OD clutch element 52 while the UD clutch element 46 remains actuated. Again, due to the ORC 55, the LR clutch element 53 need not be actuated. Moreover, the shift lever 346 need not be shifted out of drive during this 1-3 shift. From first gear 414 to second gear 416, shift lever 346 is required to be shifted into second gear from the drive position which results in the actuation of the 2C clutch element 58 while the UD clutch element 46 remains on. Lastly, to obtain a neutral position 412 from first gear, manual shift lever 346 is required to be shifted from drive to the neutral position which results in release of the UD clutch element 46.

When in neutral, a vehicle operator can shift between neutral and reverse by shifting the shift lever 346 respectively. This results in actuation and release of the associated RC clutch element 60 and LR clutch element 53.

Under the logic afforded by the shutdown shift schedule, electronic control system 318 primarily uses first gear 414 and third gear 418 to operate vehicle 321. These two gears provide the required torque and output speed needed by the vehicle 321 for a broad range of driving conditions. Preferably the 1-3 shift is actuated at a vehicle speed of 14 MPH. Likewise, the 3-1 shift is actuated at approximately 7 MPH. Different speeds are used for the upshift and downshift to eliminate any possible fighting between gears. Moreover, if needed, a vehicle driver has the option of manually shifting manual shift 346 into second, neutral or park, or reverse to obtain these respective gear states. However, as shown in FIG. 5, the shutdown shift schedule does not allow shifting into fourth gear 420 or 2nd'440. By using only first and third gear, electronic control system 318 need only selectively activate and vent the OD clutch element 52 maintaining the UD clutch element 46 on and by virtue of having an overrunning clutch ORC 55. As a result, few elements need to be used which results in a safer operation of automatic transmission 10 both for the transmission and the vehicle driver.

Under certain circumstances, a defective state caused by failure of the electrical system which supplies power to any particular valve will require that all power supplied by electronic control system 318 be terminated. As a result, electronic control system 318 will be unable to electronically apply or vent clutch elements to change gears. If the gear state is either third or fourth gear, then NDL block 442 allows a release of all elements, thereby allowing the vehicle to coast to a lower speed. When a lower speed is reached, power to all the solenoids will be terminated, allowing the vehicle to operate in second or third gear.

Figure 6:
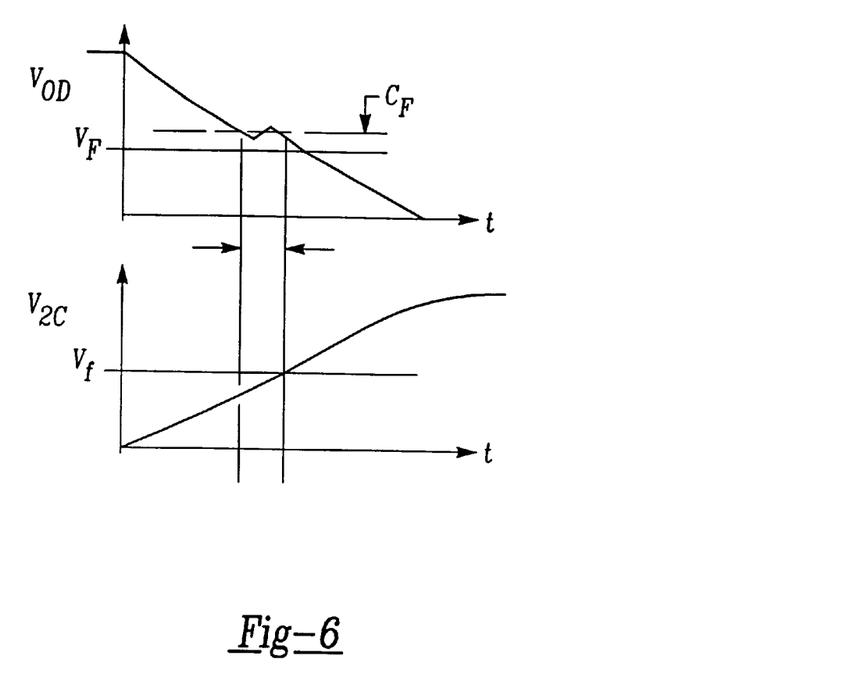
FIG. 6 is a graphical depiction of the operation of an automatic transmission according to the present invention.
Figure 7:
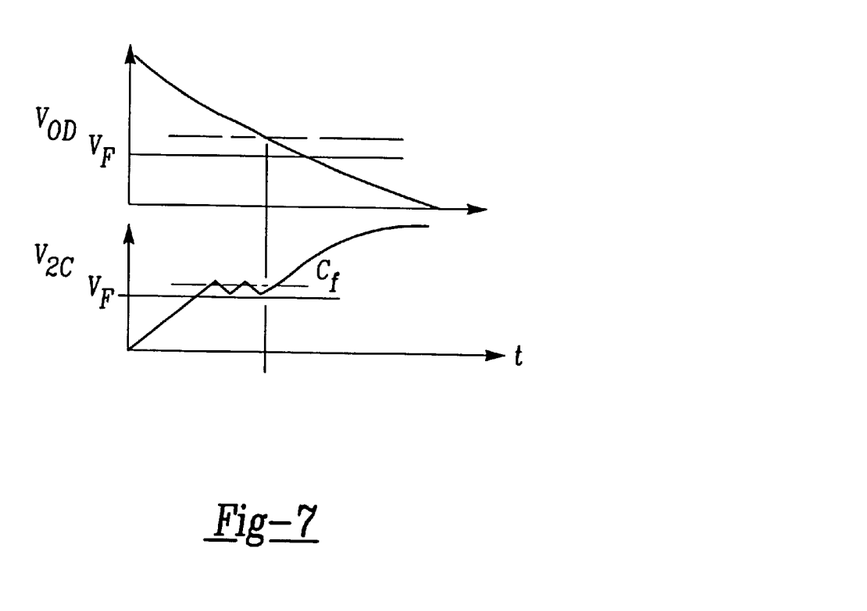
FIG. 7 is a graphical depiction of the operation of an automatic transmission according to the present invention.

Referring now to FIGS. 6 and 7, the EOC block 424, or otherwise known as element overlap control, is now described. As discussed above, a vehicle operator can shift between second and third gear. This is accomplished by application and release of the 2C clutch element 58 and the OD clutch element 52 to switch between second and third gears. Because of the handoff of torque between the OD clutch element 52 and the 2C clutch element 58, either runaway or lockup can occur between the two clutch elements depending on how fast or slowly each is released and applied. Specifically, if the element which is released vents below its fill volume before the other element is applied to a level above its fill volume, neither clutch element is supplying torque within the automatic transmission 310. As a result, there is no resistance being placed on internal combustion engine 312 to keep it from over-revving. Alternatively, if the released element does not vent below a level above its fill volume before the other element is applied to a level above its fill volume, then both elements apply a resistance to the energy supply from internal combustion engine 312. From this situation, lockup occurs.

Referring now to FIG. 6, the present invention overcomes this problem by providing an element overlap control. In FIG. 6, a first scenario is depicted. Here, the transition shown is the transition from third gear to second gear under the shutdown shift schedule. Here, the OD clutch element is vented to a point above its fill volume. As discussed above, the fill volume $V_f$ is defined as the point at which the clutch element begins applying pressure to its respective planetary gear set causing resistance thereon. The fill volume $V_f$ represents the initiation of a gear changed caused by the application of an element. Once the OD clutch element 52 is vented to its fill volume, it is maintained between the fill volume and a control limit $C_f$ until the 2C clutch element 58 has reached its respective fill volume. The control limit $C_f$ is merely a predefined upper limit which the clutch element must be maintained within. Once the 2C clutch element 58 has reached its respective fill volume, the OD clutch element 52 is allowed to completely vent. As a result, the OD clutch element 52 is slightly applied when it hands off torque transfer to the 2C clutch element 58.

Referring now to FIG. 7, the reverse situation where the applied clutch element reaches its fill volume before the vented clutch element drops below its fill volume is shown. In FIG. 7, the 2C clutch element 58 is applied until it reaches its respective fill volume. The electronic control system 318 then holds the volume of the 2C clutch element 58 at a level between a control level $C_f$ and the fill volume $V_f$ until the OD clutch element 52 drops below its fill volume. When the OD clutch element drops below its fill volume, the 2C clutch element 58 is allowed to fully apply.

Figure 8:
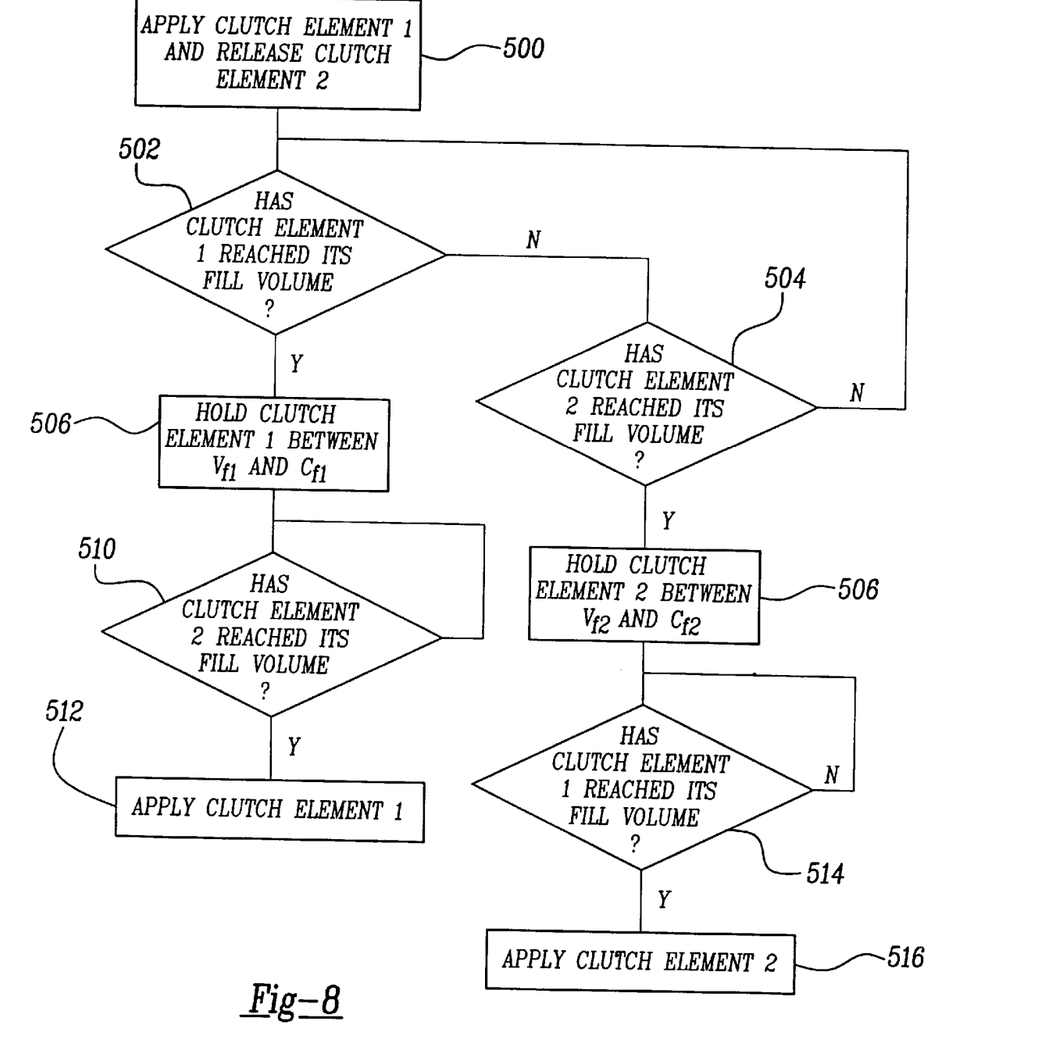
FIG. 8 is a flow chart depicting the operation of an automatic transmission according to the present invention.

Referring now to FIG. 8, the software program controlling the element overlap control is described. In the program presently described, it is understood that element 1 corresponds to the 2C clutch element 58 and element 2 corresponds to the OD clutch element 52. However, it is noted that this method can be used with any transmission clutch elements and is not limited to that which is disclosed herein. In FIG. 8, the program begins with block 500 where a first clutch element is being applied and a second clutch element is being released. In block 502 and 504, electronic control system 318 determines which element reaches its fill volume first. If element 1 reaches its fill volume first, then block 506 and 510 ensure that clutch element 1 is held between $V_f1$ and $C_f1$ until clutch element 2 has reached its fill volume. Block 512 then allows clutch element 1 to be applied. If clutch element 2 reaches its fill volume first, then block 507 and 514 ensure that clutch element 2 is held between $V_f2$ and $C_f2$ until element 1 has reached its respective fill volume. Block 516 then allows element 2 to be released.

It is noted that higher throttle opening corresponds with more force required by a particular friction element to hold a transmission in gear. As such, with increased throttle opening, it is desirable to hold the element being maintained in the above described scenarios at a higher volume than normal. This also results in an increased $C_f$. This ensures that the associated element does not slip due to the higher forces being applied thereof.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. In an automatic transmission having a controller, said controller programmed with a normal shift schedule to shift said automatic transmission between various shift states, said automatic transmission having a manual shift solenoid shiftable between shift R, shift N, shift D and shift 2, a method for using a shutdown shift schedule in place of said normal shift schedule when said transmission is in a gear state selected from the set consisting of R, N, 1, 2, 2', 3, and 4, said method comprising:

providing said automatic transmission;

monitoring gear state conditions indicative of said gear state which said automatic transmission is in; and using said shutdown shift schedule in place of said normal shift schedule for changing gears of said automatic transmission when said gear state conditions vary from a stored gear state reported by said normal shift schedule, said controller adapted to shift between a plurality of gear states when in said shut down shift schedule.

2. The method as claimed in claim 1, wherein said controller is adapted to allow a 3-1 shift when said manual shift solenoid is in said shift D and said gear state is 3rd gear, said shutdown shift schedule is adapted to allow a 3-2 shift when said gear state is 3rd gear and said shift solenoid is in said shift 2.

3. The method as claimed in claim 1, further comprising the step of resuming said normal shift schedule when said gear state conditions are within specified tolerances of said stored gear state.

4. The method as claimed in claim 1, wherein said shutdown shift schedule is adapted to instruct said automatic transmission to undergo a 3-1 shift when said gear state is 3rd gear and said shift solenoid is in said shift D.

5. The method as claimed in claim 1, wherein said controller is adapted to calculate said gear state conditions from a turbine speed and transmission output speed.

6. The method as claimed in claim 5, wherein vehicle speed is monitored for calculating said transmission output speed after the step of using said shutdown shift schedule, said controller adapted to calculate said transmission output speed from said vehicle speed.

7. The method as claimed in claim 5, wherein a gear state is obtained and monitored from a CPU for determining said gear state conditions after the step of using said shutdown shift schedule, said controller adapted to calculate said turbine speed from said vehicle speed and said gear state.

8. The method as claimed in claim 1, wherein said normal shift schedule is adapted to provide element overlap control for said 3-2 shift.

9. The method as claimed in claim 1, wherein said shutdown shift schedule is adapted to instruct said automatic transmission to undergo a 4-3 shift when said shift solenoid is in said shift D and said gear state is 4th gear.

10. The method as claimed in claim 1, wherein said shutdown shift schedule is adapted to instruct said automatic transmission to undergo a 2-1 shift when said shift solenoid is in said shift 1 and said gear state is 2nd gear.

11. The method as claimed in claim 1, wherein said shutdown shift schedule is adapted to instruct said automatic transmission to undergo a 1-3 shift when said shift solenoid is in said shift D and said gear state is 1st gear.

12. The method as claimed in claim 1, wherein said shutdown shift schedule is adapted to instruct said automatic transmission to undergo a 2'-1 shift, a 2'-2 or a 2'-3 shift when said shift solenoid is in said shift D and said gear state is 2' gear.

13. The method as claimed in claim 1, wherein said shutdown shift schedule is adapted to instruct said automatic transmission to undergo a N–1 shift when said shift solenoid is in said shift D and said gear state is N.

14. In an automatic transmission having a planetary geartrain including at least one planetary gearset, said planetary geartrain including a first friction member selectively engagable in combination with an overrunning clutch for obtaining a first gear ratio and a second friction member selectively engagable in combination with said first friction member for obtaining a second gear ratio lower than said first gear ratio, said automatic transmission having a controller, said controller programmed with a normal shift schedule to shift said automatic transmission between multiple shift states, a method for using a shutdown shift schedule in place of said normal shift schedule when said transmission is in a gear state selected from the set consisting of R, N, 1, 2, 2', 3, and 4, said method comprising:

monitoring gear state conditions indicative of said gear state which said automatic transmission is in; and using said shutdown shift schedule in place of said shift schedule for changing gears of said automatic transmission when said shift state conditions vary from a stored gear state reported by said shift schedule, said shutdown shift schedule adapted to shift between said first gear ratio and said second gear ratio; and resuming said normal shift schedule when said gear state conditions are within specified tolerances of said stored gear state.

15. The method as claimed in claim 14, wherein said first friction element is a UD clutch element and said second friction element is an OD clutch element.

16. The method as claimed in claim 14, wherein said gear state conditions are calculated from turbine speed and transmission output speed.

17. The method as claimed in claim 14, wherein vehicle speed is monitored after the step of using said shutdown shift schedule, said controller adapted to calculate said transmission output speed from said vehicle speed.

18. The method as claimed in claim 14, wherein said gear state conditions are obtained and monitored from a CPU after the step of using said shutdown shift schedule, said controller adapted to calculate said turbine speed from a vehicle speed and said gear state.

* * * * *